US009666403B2

(12) United States Patent
Dondokovich Dugar-Zhabon et al.

(10) Patent No.: US 9,666,403 B2
(45) Date of Patent: May 30, 2017

(54) COMPACT SELF-RESONANT X-RAY SOURCE

(75) Inventors: Valeriy Dondokovich Dugar-Zhabon, Bucaramanga (CO); Eduardo Alberto Orozco Ospino, Bucaramanga (CO)

(73) Assignee: UNIVERSIDAD INDUSTRIAL DE SANTANDER, Bucaramanga (CO)

( * ) Notice: Subject to any disclaimer, the term of this patent is extended or adjusted under 35 U.S.C. 154(b) by 102 days.

(21) Appl. No.: 14/342,346

(22) PCT Filed: Aug. 31, 2012

(86) PCT No.: PCT/IB2012/054504

§ 371 (c)(1), (2), (4) Date: Jul. 3, 2014

(87) PCT Pub. No.: WO2013/030804

PCT Pub. Date: Mar. 7, 2013

(65) Prior Publication Data

US 2015/0043719 A1 Feb. 12, 2015

(30) Foreign Application Priority Data

Sep. 1, 2011 (CO) .................................... 11112696

(51) Int. Cl.
*H01J 35/14* (2006.01)
*H05G 2/00* (2006.01)
(Continued)

(52) U.S. Cl.
CPC .............. *H01J 35/14* (2013.01); *H01J 35/00* (2013.01); *H01J 35/12* (2013.01); *H05G 2/00* (2013.01);
(Continued)

(58) Field of Classification Search
CPC .. H05G 2/00; H05H 7/04; H05H 7/16; H05H 7/18; H05H 13/00; H05H 13/005;
(Continued)

(56) References Cited

U.S. PATENT DOCUMENTS 3,728,217 A * 4/1973 Dandl ...................... H05H 1/12 313/161
5,334,943 A * 8/1994 Sawada .................... H05H 9/00 313/359.1
(Continued)

FOREIGN PATENT DOCUMENTS

WO 9317446 A1 9/1993
WO 9818300 A2 4/1998

OTHER PUBLICATIONS

Kasamsook et al, Study on compact DC electron gun using single crystal cathode of LaB6, Feb. 2007, Proc. of APAC, Indore, India, p. 181.*

(Continued)

*Primary Examiner* — Glen Kao
(74) *Attorney, Agent, or Firm* — Holland & Hart LLP

(57) ABSTRACT

An X-ray source, which includes a resonant cavity preferably of a cylindrical shape, is excited in a microwave mode $TE_{11p}$ and affected by a static and non-homogeneous magnetic field that grows longitudinally. An electron beam is injected longitudinally through one of the lateral walls of the cavity and is continuously accelerated until it reaches an energy sufficient to produce X-rays after the electrons bombard a metallic target located in the plane where they stop their longitudinal movement. The profile of the magnetic field grows in such a way that it maintains the conditions of electron cyclotron resonance along the helical paths of the electrons, The device can be used to obtain radiographic images and even produce hard X-rays.

26 Claims, 10 Drawing Sheets

(51) Int. Cl.
*H01J 35/00* (2006.01)
*H01J 35/12* (2006.01)
*H05H 7/04* (2006.01)
*H05H 13/00* (2006.01)

(52) U.S. Cl.
CPC ............ *H05H 7/04* (2013.01); *H05H 13/005* (2013.01); *H01J 2235/1204* (2013.01)

(58) Field of Classification Search
CPC H05H 15/00; H01J 35/00; H01J 35/12; H01J 35/14; H01J 2235/1204
See application file for complete search history.

(56) References Cited

U.S. PATENT DOCUMENTS

| | | | | |
|---|---|---|---|---|
| 6,060,833 | A * | 5/2000 | Velazco | H05H 7/16 315/5.41 |
| 6,327,338 | B1 * | 12/2001 | Golovanivsky | H01J 35/00 378/119 |
| 6,617,810 | B2 | 9/2003 | Symons | |
| 7,206,379 | B2 | 4/2007 | Lemaitre | |
| 2005/0111625 | A1 | 5/2005 | Lemaitre | |
| 2006/0050746 | A1 * | 3/2006 | Elyan | H01J 35/14 372/10 |
| 2006/0222878 | A1 * | 10/2006 | Watanabe | H01J 5/46 428/553 |
| 2007/0183575 | A1 * | 8/2007 | Lemaitre | H01J 35/14 378/122 |
| 2010/0008471 | A1 * | 1/2010 | Morton | G21K 1/02 378/141 |
| 2010/0075003 | A1 * | 3/2010 | Lindsay | A23B 4/015 426/240 |
| 2011/0006708 | A1 * | 1/2011 | Ho | H05H 9/04 315/505 |

OTHER PUBLICATIONS

Rapozo et al., Electron Temperature Effect on Plasma Potential for Different Resonant Volumes in Lisa Machine, Jun. 2013, Brazilian Journal of Pliysics, vol. 23, No. 2, p. 204.*

Garner, H.R. et al., An Inexpensive X-Ray Source Based on an Electron Cyclotron, Mag. Sci Instruments, 61 (2), p. 724-727, Feb. 1990.

Baskaran, R., et al., Studies on Enhancement of X-Ray Flux in the Compact Electron Cyclotron Resonance Plasma X-Ray Source, Review of Scientific Instruments, vol. 71, No. 2, 1203-1205, Feb. 2000.

Dugar-Zhabon, Valeriy D., et al., Cyclotron spatial autoresonance acceleration model, Phys. Rev. ST Accel. Beams 12, 041301-1 through 041301-8 (2009).

Dougar-Jabon, Valeri D., et al., Modeling of electroncyclotron resonance acceleration in a stationary inhomogeneous magnetic field, Phys. Rev. ST Accel. Beams 11, 041302-1 through 041302-5 (2008).

Dugar-Zhabon, Valeriy D., et al., Three-Dimensional Particle-In-Cell Simulation of Spatial Autoresonance Electron-Beam Motion, IEEE Transactions on Plasma Science, vol. 38, No. 10, pp. 2980-2984, Oct. 2010.

PCT International Search Report from PCT International Patent Application No. PCT/IB2012/054504, mailed Apr. 24, 2013.

* cited by examiner

COMPACT SELF-RESONANT X-RAY SOURCE

TECHNICAL FIELD

Traditional X-ray sources produce energy beams in the 50-150 keV range (soft X-rays). In these sources, the electrons are accelerated by a stationary field until they impact with a thermo-resistant target, commonly molybdenum. These X-ray sources require high power supply voltage, which are bulky and heavy.

In 1990, H. R. Gardner, T. Ohkawa, A. M. Howald, A. W. Leonard, L. S. Peranich and J. R. D'Aoust (Mag. Sci Instruments, 61 (2), February 1990, p. 724-727) proposed the use of a cyclic electron accelerator as a compact X-ray source. In this proposal, a flow of electrons injected from a filament in the center of an empty resonant cavity accelerates in the middle plane of the cavity by a microwave field in terms of electron cyclotron resonance (ECR) until reaching 150 keV in energy and then impacting on a molybdenum target, producing X-ray radiation. Although this source advantageously avoids the use of a high voltage power, it is not realistic for routine use in industry, medicine and agriculture because the current used is only of 0.1 nA and hence the X-ray intensity emitted is weak. In order to increase the intensity of the emitted X-rays, more intense currents should be used, which necessarily increases the radius of the filament. However, this change is undesirable because it disturbs the microwave field since the filament is made of a metal, namely, tungsten or molybdenum.

WO 9317446 discloses a compact X-ray source that produces rays by heating plasma under ECR conditions, forming a plasmic rotary ring in the middle plane of the source. The energetic electrons of the ring bombard ions and heavy atoms to create an X-ray emission source. This source consumes energy not only to heat the electrons, but to maintain the discharge in the cavity. Moreover, the electrons of the ring are only a small fraction of the plasma electrons and are not accelerated directly by the microwave field but through the collective effects, which are much less effective than direct acceleration. Therefore, from the energy consumption point of view, this source is less effective than traditional sources. Additionally, the electrons that impact are not mono-energetic, which produces a scattered X-ray spectrum.

The publication *Review of Scientific Instruments,* 71 No. 2, (2000) 1203-1205 theoretically studies the electron acceleration under ECR conditions in a rectangular resonant cavity $TE_{101}$ mode affected by a DC magnetic field transversely oriented to the cavity, from which an X-ray source is designed and built, wherein the electrons are accelerated on spiral orbits in the medium longitudinal plane of the cavity and then impact a molybdenum target to produce X-rays. One disadvantage of said source is that in practice, it is very difficult to obtain profiles of the magnetic field in the plane of motion that allows self-maintenance of ECR conditions; this is why a uniform magnetic field is used.

There are other electron acceleration mechanisms using X-ray generation as described in U.S. Pat. No. 6,617,810, which has an accelerator with multiple cavities with a constant static magnetic field or slightly decreasing over the cavities, which uses drift tubes and which operates at low frequencies, less than the local relativistic cyclotronic frequency of the beam in each cavity; which constitutes an efficient and compact accelerator system. This device provides acceleration rates in the order of 20 MeV/m but requires high power microwave generators (10 mW in the first cavity and 7.7 MW in the second).

U.S. Pat. No. 7,206,379 discloses a radio frequency (RF) cavity which accelerates electrons to form images such as those produced by X-ray tubes and computed tomography (CT), where electrons are accelerated in the transverse plane of the cavity (or waveguide) when electron pulses are injected through one end of the cavity during semicycles of the RF field. The accelerated electrons in the cavity are used to generate X-rays by the interaction with a solid or liquid target. One of the main factors affecting the energy that impact electrons is the uncertainty in the phase of the electromagnetic wave at the instant when the electron leaves the emitter.

In traditional X-ray sources, the maximum voltage applied, which determines the maximum energy of X-rays, does not exceed 200 kV for electrical insulation purposes, while ECR-based sources described in the patent literature are hardly applicable to practice and therefore not produced industrially.

The publications *IEEE Transaction on Plasma Science,* 38 No. 10, (2010) 2980-2984; *Physical Review, ST Acceleration and Beams,* 12 (2009) 0413011-0413018 y *Physical Review, ST Acceleration and Beams,* 11 (2008) 0413021-0413027, theoretically study the self-resonant electron acceleration that propagates along a static and non-homogeneous magnetic field that varies in the direction of propagation of electrons using microwave cylindrical modes $TE_{11p}$ (p=1, 2, 3, . . . ). Despite of theoretically studying the acceleration, these documents do not concentrate in the production of X-rays, which requires the use of additional components such as: coupling system for injection of microwave energy, window system to maintain the vacuum in the cavity, protection system of the microwave generator against reflected microwaves, the system that guarantees the TE11p mode of circular polarization in the cavity, target with cooling channels and its positioning, as well as a window for extracting X-rays.

Likewise, the cyclotron radiation sources can also be considered as part of the art, since such embodiment can be achieved by the device of the present invention.

BRIEF DESCRIPTION OF THE INVENTION

As mentioned above: (i) the X-rays emitted by the source disclosed by H. R. Gardner and researchers, are of low intensity and low energy; (ii) the energy of the source disclosed in WO 9317446 is not very efficient and the X-ray spectrum is scattered; (iii) the source of the publication *Review of Scientific Instruments,* 71 No. 2, (2000) 1203-1205 that uses a rectangular cavity operates in the $TE_{101}$ single mode and cannot keep the ECR conditions; (iv) the electron accelerator of multiple cavities disclosed in U.S. Pat. No. 6,617,810 is bulky; and (v) the efficiency of the source disclosed in U.S. Pat. No. 7,206,379 is affected by the uncertainty of the phase of the electromagnetic wave.

The X-ray source of the present invention discloses some characteristics that prevent such deficiencies as follows:

(i) electron beams can be accelerated to 300 keV in energy even with a 0.1 A current. These energy and power values are sufficient to produce X-rays with energy values greater than 200 keV (hard X-rays) and higher intensity. Additionally, the electron gun used is coupled at one end of the resonant cavity and not inside it, reason why it does not disturb the microwave field; (ii) it is energy efficient because the electrons are accelerated directly by the microwave field, (iii) it is possible to maintain the ECR conditions along the three-dimensional helical movement of injected electrons along the cavity by applying a non-homogeneous DC magnetic field along the axis. The cavity may be cylindrical, elliptical or rectangular; (iv) the source is reduced in size because it uses a single cavity; and (v) the initial phase of the waveform does not affect the acceleration effectiveness.

Based on the electron cyclotron acceleration self-resonance scheme mentioned in the *IEEE Transaction on Plasma Science,* 38 No. 10, (2010) 2980-2984; *Physical Review, ST Acceleration and Beams,* 12 (2009) 0413011-0413018 and *Physical Review, ST Acceleration and Beams,* 11 (2008) 0413021-0413027 publications, i.e., in the electron cyclotron resonance self-maintenance conditions, the present invention discloses a compact device capable of producing hard X-rays of energy greater than 200 keV, and of not less intensity than traditional X-ray sources. In the claimed source, the injected electrons from one end of a cylindrical resonant cavity subject to vacuum, are accelerated in a $TE_{11p}$ (p=1, 2, 3 . . . ) microwave mode, of a linear or circular polarization. However, the cross section of the cavity can also be elliptical, energized with the TEc11P mode (P=1, 2, 3, . . . ), and even rectangular with any TE10p mode, where p=1, 2, 3 . . . .

In order to maintain the self-resonance regime along the helical paths of electrons within the cavity, a non-homogeneous static magnetic field is generated, whose intensity increases mainly in the direction of propagation of the electrons with a profile that depends on the beam injection energy generated and the amplitude of the microwave field. The electron beam accelerates in a self-resonant cyclotronic way from its injection into the cavity until it hits on a target. The beam path is helical and its acceleration occurs in self-resonant conditions. Therefore, the effectiveness of the use of the microwave power is the maximum possible. For a given frequency, the larger the subscript p, the more energy can be transferred to the electrons.

In an additional embodiment of the present X-ray source, a rectangular shaped resonant cavity is used, which is energized under the $TE_{10p}$ microwave mode. In this case, general characteristics of the X-ray source mentioned above are the same, being only necessary modifications regarding how to energize said mode.

In an additional embodiment, a possibility of using the present invention as a source of cyclotron radiation is considered, using preferably the cylindrical cavity 1, but performing some structural modifications to the same, in order to achieve said purpose. This system allows for a significant increase in energy of the electron beam by compensating the diamagnetic force by an axially symmetric electrostatic field. The longitudinal electrostatic field is generated by ring type electrodes placed inside the cavity, preferably in the node planes of the $TE_{11p}$ electric field type. The electrodes should be fabricated with a material transparent to the microwave field, such as graphite.

BRIEF DESCRIPTION OF THE FIGURES

For a better understanding of this invention, the following figures are included as examples.

FIG. 5A showing a system of magnetic rings and the magnetic field lines, and FIG. 5B showing a magnetic field profile along the axis of the cavity of the present invention.

DETAILED DESCRIPTION OF THE INVENTION

Figure 1:
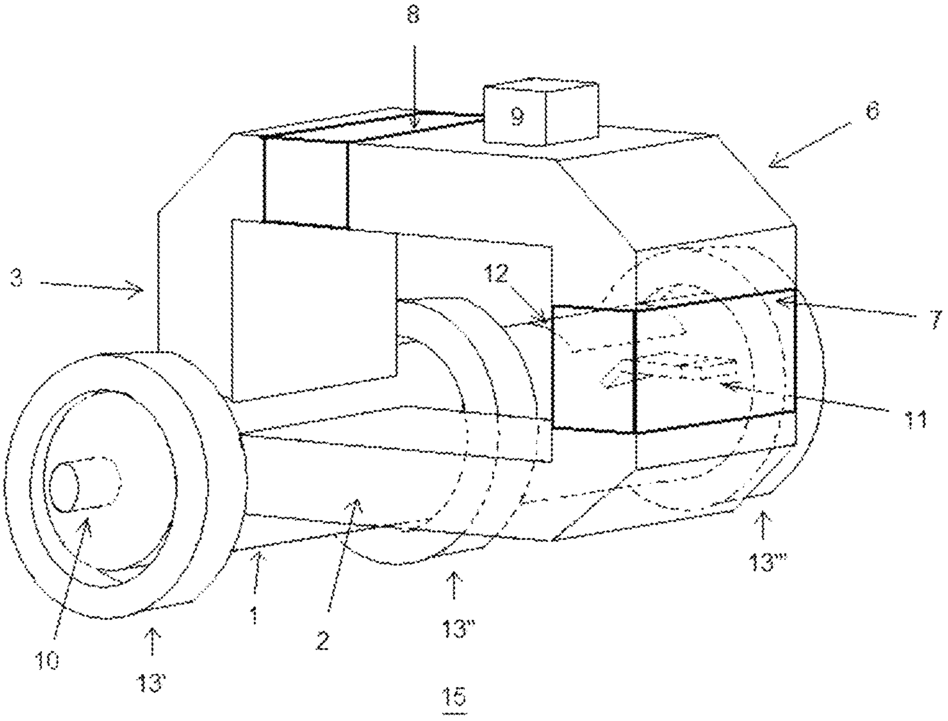
FIG. 1 Preferred embodiment of the X-ray source.
Figure 2:
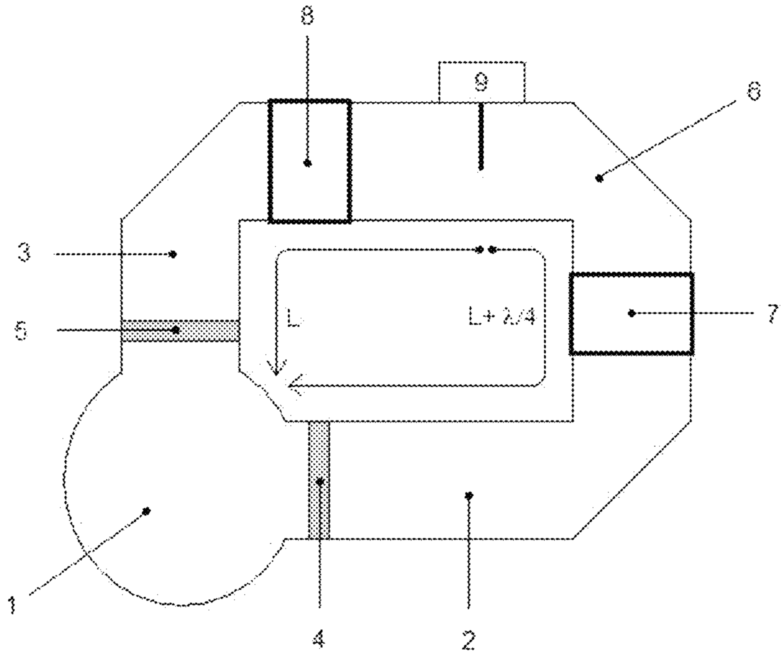
FIG. 2 Front view of the coupling for energizing of the TE112 mode with circular polarization.

In FIGS. 1 and 2, the basic components of the preferred embodiment of the compact X-ray source are shown. Referring to FIG. 1, the microwave resonant cavity 1 is coupled with an electron gun 10, a target 11 upon which the electron impact, light metal window 12 and a microwave energizing system. The cavity 1 is affected by a magnetic field generated by three magnetic field sources 13', 13'' and 13'''.

The cavity 1 is of a cylindrical shape and made of metal, preferably of copper to reduce heat losses from the walls thereof. The cavity 1 resonates, in the case of the preferred embodiment, in the cylindrical $TE_{112}$ mode, and its length and diameter are 21 cm and 9 cm, respectively, dimensions that maximize the intensity of the electric field within it. These values must have a relationship described by the following expression, $d=p[(2f/c)^2-(1.841/\pi r)^2]^{-1/2}$, where: p=2 (for the TE112 mode), f=frequency of the magnetron, $c=3\times10^8$ m/s, and r=(cavity diameter)/2. In practice, one of the advantages of using a single resonant cavity is that it reduces the size of the device. In the preferred embodiment a cylindrical cavity is considered. However, the cross section of the cavity may be elliptical, energized with the $TE_{c11P}$ mode (P=1, 2, 3, . . . ).

The electron gun 10, preferably based on a rare earth electron emitter, preferably of the $L_aB_6$ type, which is coupled to one end of the cavity 1. The gun 10 injects a quasi mono-energetic electron beam along the axis of symmetry of the cavity 1 with an energy of about 10 keV.

Figure 3:
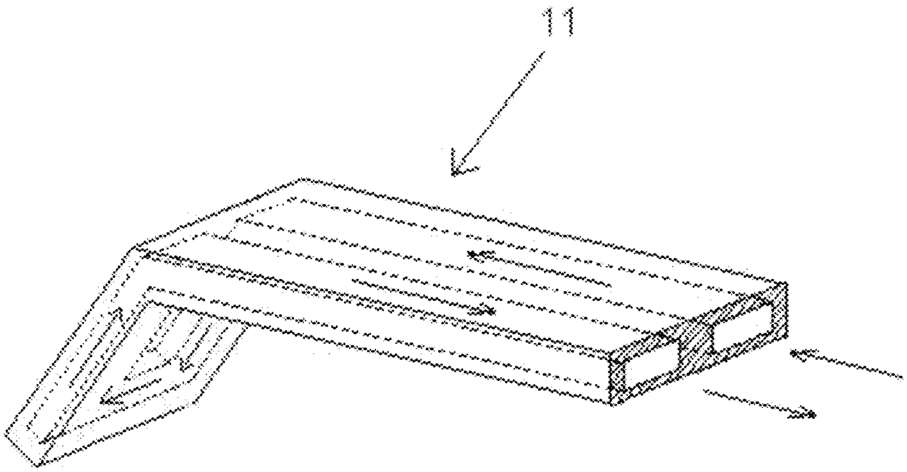
FIG. 3 White metallic target with cooling channels.

The thermo-resistant and resistant to cracking, preferably molybdenum, nonmagnetic metal target 11, has an internal channel used for cooling by circulating water (as the cooling channel of FIG. 3) or by fan cooling edges.

The light metal window 12, preferably beryllium, must ensure the passage of the emitted X-rays by the impact of electrons with the metal target 11 without damping. That is, it should be transparent for the rays.

The three magnetic field sources 13', 13'' and 13''' produce an axially symmetric static and homogeneous magnetic field, increasing along the cavity, which in the preferred embodiment is created by a system of permanent magnetic magnets, preferably of ferromagnetic SmCO5 or FeNdB ring shaped. The magnetization, dimensions and spacing of the magnets system is selected so that, preferably: (i) the magnetic field strength at the point of electrons injection is equal to the corresponding value of classical cyclotron resonance, for example 875 Gauss with 2.45 GHz microwave and (ii) the magnetic field strength increases appropriately along the axis of the cavity 1 to hold the ECR by compensating the relativistic effect of the increasing of the mass.

In FIG. 2 it can be seen that the microwave excitation system has two waveguides 2 and 3 coupled to the cavity 1, two ceramic windows 4 and 5, a coupling waveguide 6, two ferrite insulators 7 and 8 and a microwave generator 9. The microwave power is injected into the cavity 1 through the windows 4 and 5, preferably ceramic Si2O3, by means of the waveguides 2 and 3, separated azimuthally by 90° and coupled to the cavity 1 in a plane located at a distance of a quarter of the length of the cavity 1, d/4, distance from the end which is coupled to the electron gun 10. The waveguides 2 and 3 provide microwave energy in a $TE_{10}$ from a microwave generator 9, which may be a magnetron of 2.45 GHz (the magnetron has a power source system), though a coupling waveguide 6. The two paths used for the microwave injection have lengths L and L+λ/4, where λ is the wavelength of the $TE_{10}$ mode, which produces a phase shift of π/2 to energize the wave $TE_{112}$ with a right polarized circular wave in the cavity 1. Moreover, the microwave generator 9 is coupled to a waveguide coupling 6, which is coupled at each of its ends with ferrite insulators 7 and 8 used to protect the microwave generator 9, which in the preferred embodiment is a magnetron, of the reflected power. The ferrite insulators 7 and 8 are connected to the waveguides 2 and 3 respectively. Ceramic windows 4 and 5, incorporated in the inside of the waveguides 2 and 3 are transparent to microwaves and is used to maintain the vacuum in the cavity 1, which has been hermetically sealed after obtaining vacuum therein.

Figure 4:
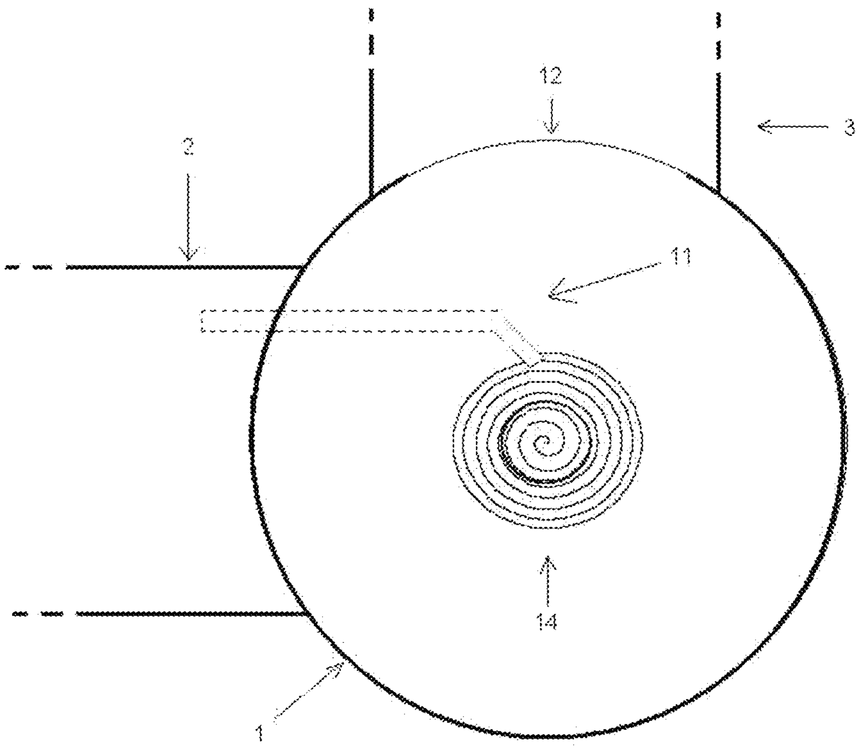
FIG. 4 Front view of the electron beam.

In order to start the X-ray source, the microwave generator 9 and the electron gun 10 are turned on. The generator 9 transmits the microwave energy at a frequency of 2.45 GHz to the resonant cavity 1 through the waveguides 2 and 3. Due to the location and the magnetization of the magnetic field sources 13', 13" and 13''', which in the preferred embodiment are three ring-shaped magnets, a region is created in which the electron cyclotron frequency remains almost constant inside the cavity 1. The microwave energy in the cavity 1 accelerates the electrons by ECR along their helical paths 14 (FIGS. 4 and 6) until impacting the metal target 11, thus producing X-rays, which pass through the window 12. The amplitude of the microwave electric field $TE_{112}$ of 7 kV/cm circularly polarized ensures the production of X-rays with energy of the order of 250 keV. In general, cylindrical cavities resonating in modes $TE_{11p}$ (p=1, 2, 3, . . . ) can be used.

Figure 5A:
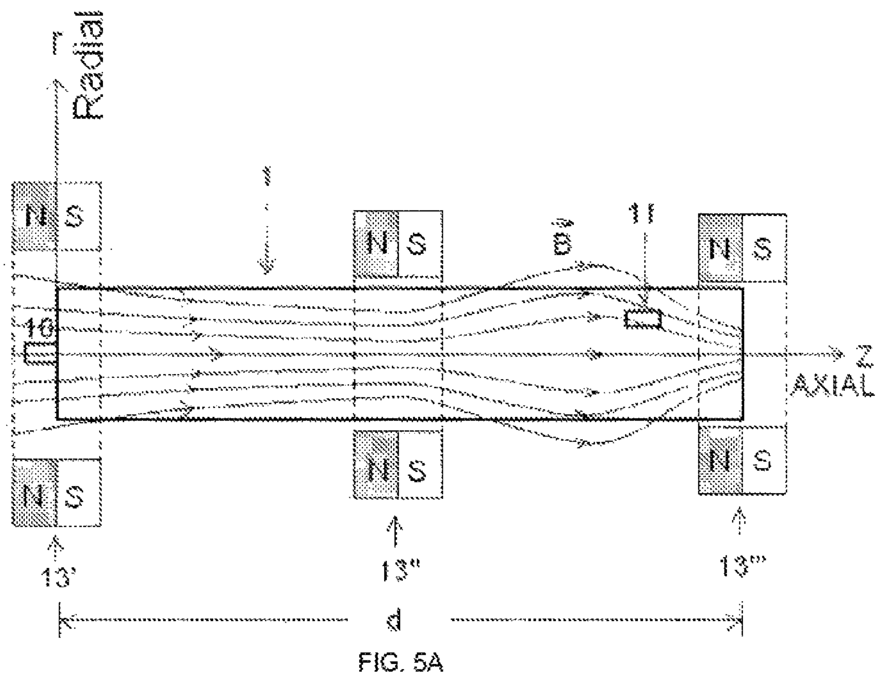
FIGS. 5A and 5B Description of the external magnetic field including.
Figure 5B:
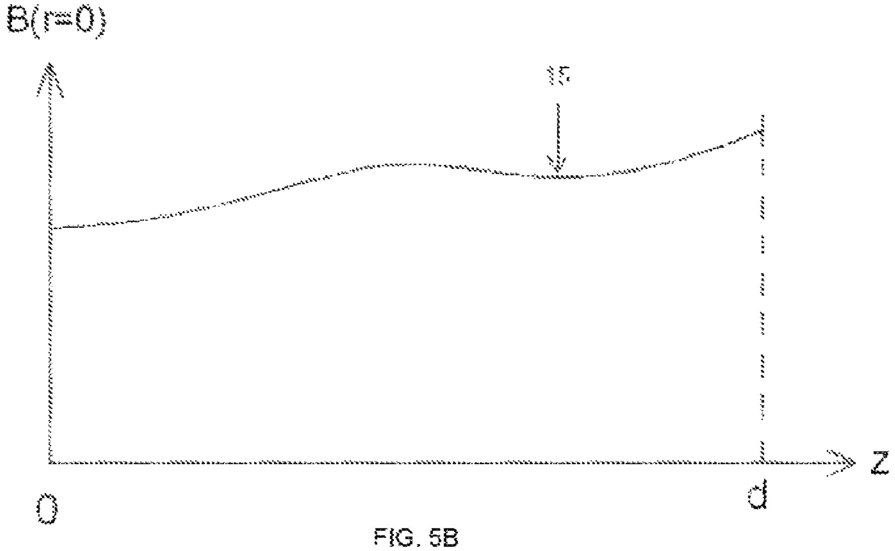

In FIG. 5*a*, it can be seen a graph illustrating the increased magnetic field along the cavity formed by the magnetic field sources 13', 13", 13''', showing the field lines produced in the region of interest. As shown from the separation between the magnetic field lines, this is increased (not monotonically) as the electrons move from the position of the electron gun 10 toward the target 11. FIG. 5*b* shows an example of the longitudinal profile of the magnetic field adjusted for the microwave $TE_{112}$ mode of the preferred embodiment. One can appreciate a local minimum 15 of the magnetic field in the second half of the cavity.

Figure 6:
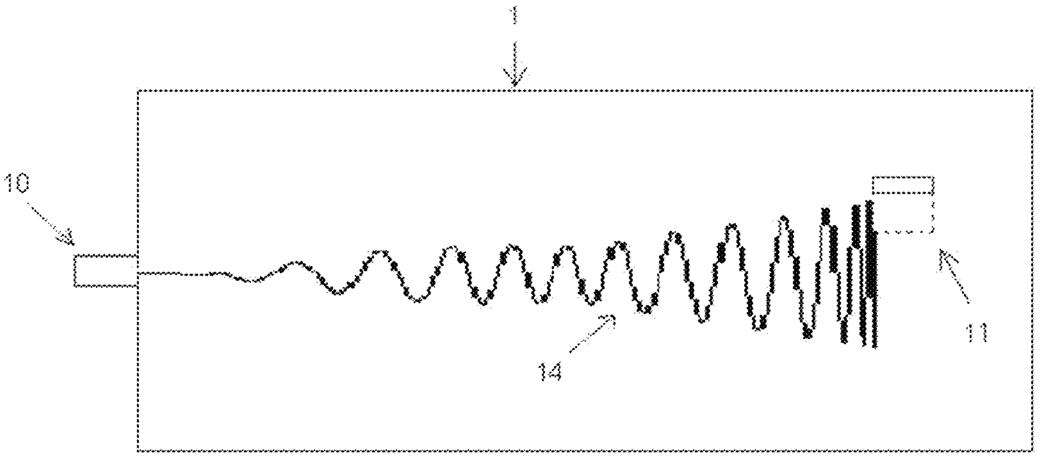
FIG. 6 Side view of the electron beam.

As shown in FIG. 6, the electrons stop their longitudinal movement in a position located between the local minimum 15 (see FIG. 5*b*) and the rear end of the cavity 1, which determines the position of the target 11. In this position the electrons have increased their radii of rotation, enabling the impact with target 11. Electrons that are able to move beyond the plane where the target is located, are reflected by the static magnetic field that grows in the space behind them, having another chance to hit back in their movement. It can also be seen in FIG. 4 that the length of penetration of the target 11 inside the cavity 1 is defined from the average Larmor radius of the electrons located in this position.

Figure 7:
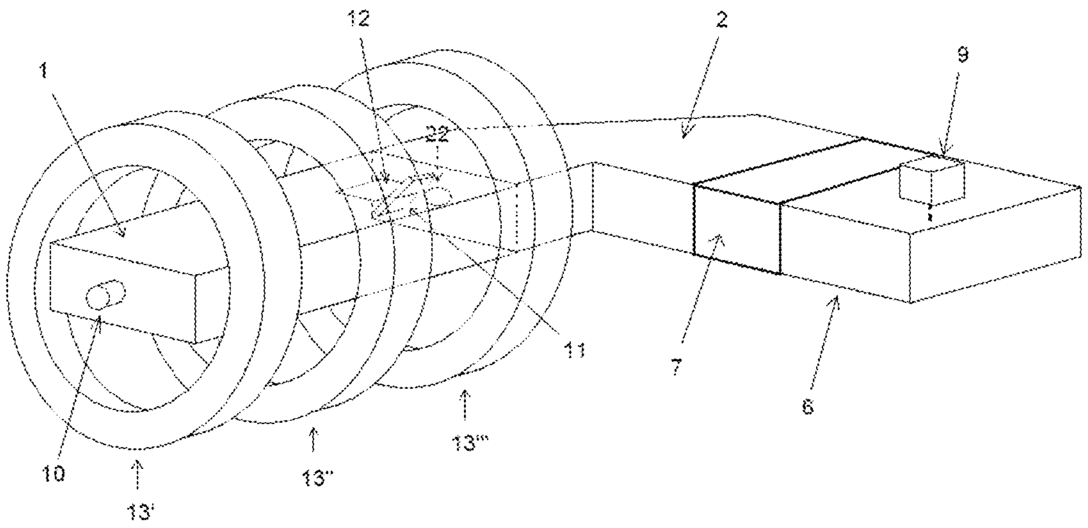
FIG. 7 Alternative embodiment of the X-ray source.
Figure 8:
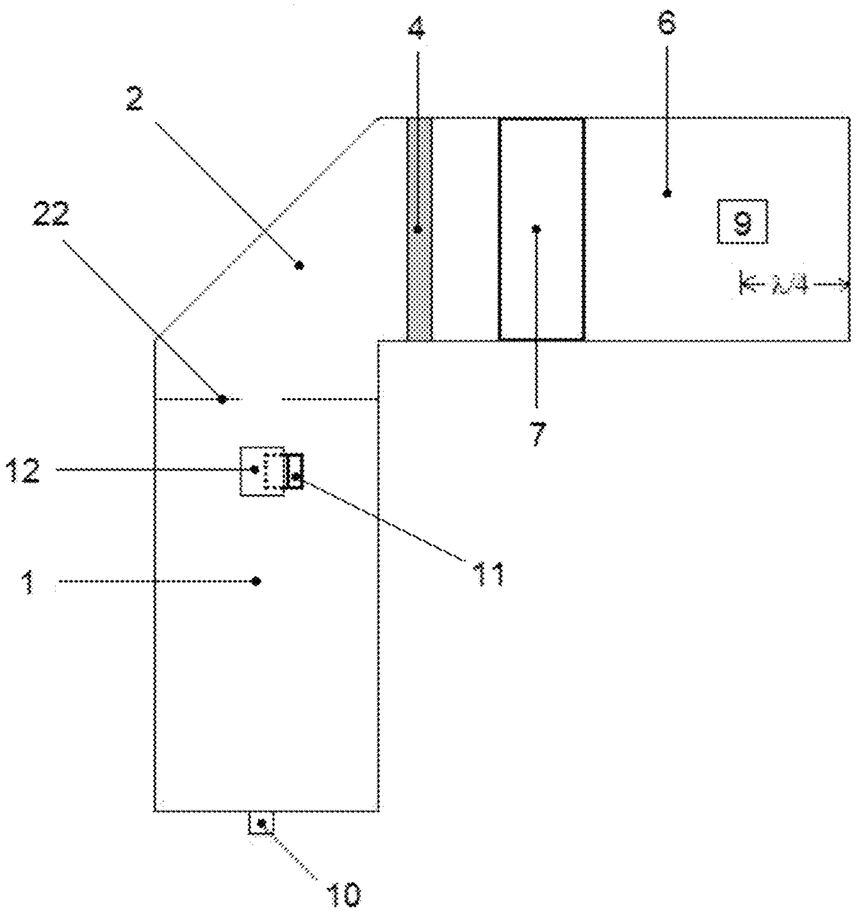
FIG. 8 Top view of the alternative embodiment of the X-ray source (the magnetic field sources are not shown).
Figure 9:
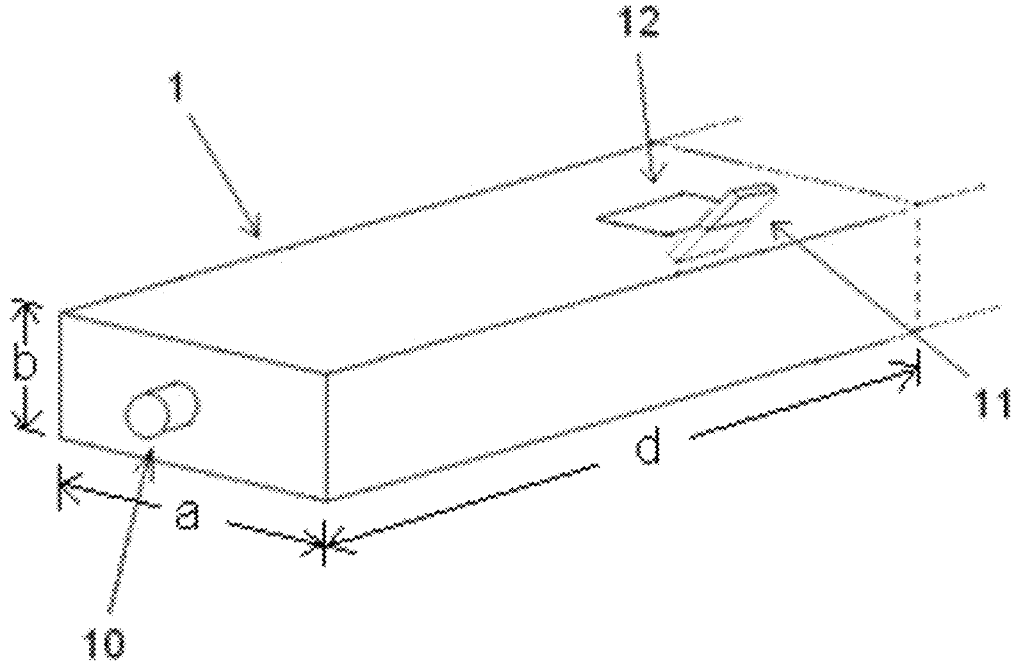
FIG. 9 Metallic target and X-ray extraction in the alternative embodiment of the X-ray source.

In an alternative embodiment of the X-ray source, the geometry of the resonant cavity 1 is modified, the microwave mode energized in the cavity and the energization mechanism as described below:

In FIGS. 7-9, the basic components of an alternative embodiment of the source are shown. A rectangular resonant microwave cavity 1 which is in vacuum and resonates in a $TE_{10P}$ mode (P=1, 2, 3 . . . ), a waveguide 2 which is coupled to the cavity 1 through an iris or resonant window 22, a microwave generator 9 connected to the coupling waveguide 6 which is coupled to the waveguide 2 through the ferrite insulators 7, three sources of magnetic field 13', 13" and 13''', an electron gun 10 which is coupled to one end of the rectangular cavity 1, and a target 11 coupled to the cavity 1 on which the electrons impact. The positions of the permanent magnets of the magnetic field source 13', 13", 13''' shown in FIG. 7 correspond to the case in which a $TE_{102}$ mode is energized in the rectangular cavity 1. In FIG. 9 it is shown the cavity dimensions a=7.74 cm, b=3.87 cm and d=20 cm. The dimensions must meet the relationship described by the expression $d=p[(2f/c)^2-(1/a)^2]$, where f—magnetron frequency, and c—speed of light in vacuum. The parameter b is random.

The rectangular cavity 1 is hermetically sealed after obtaining vacuum on it. The microwave power is injected into the rectangular cavity 1 through the iris 22, supplied through the waveguide 2 by a $TE_{10}$ mode from a microwave generator 9 located at λ/4 from the end of the waveguide coupling 6, where is the wavelength of the $TE_{10}$ mode. In the rectangular cavity 1, it is energized the $TE_{10P}$ mode (p=1, 2, 3 . . . ). The ceramic window 4 is transparent to the microwaves and serves to maintain the vacuum in the cavity. The microwave generator 9, preferably a magnetron, is protected from reflected microwave power by means of an ferrite insulator 7. The waveguide 2 by which the direction of propagation of the $TE_{10}$ mode is changed, is included in order to avoid any possible impact of the electron beam with the ceramic window 4 at the moment when the X-ray source is turned on, which could happen if the waveguide 6 would be aligned with the cavity 1.

Once the X-ray source is started, the electrons impact the target 11 and are extracted through the window 12 made of a light metal preferably beryllium.

Figure 10:
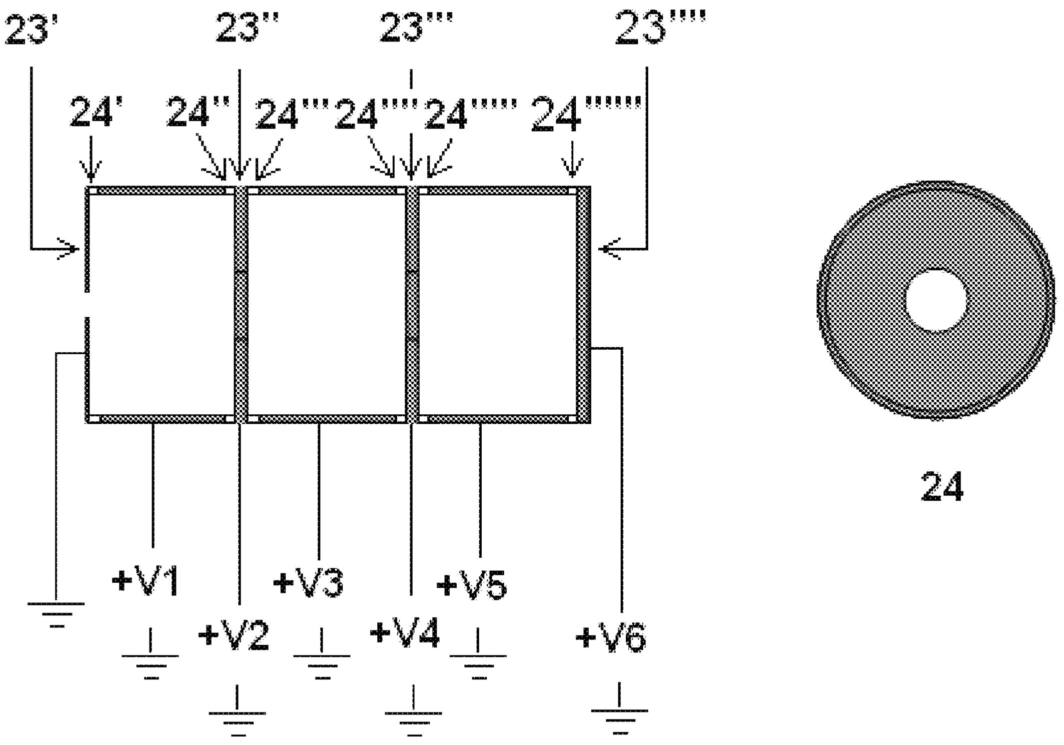
FIG. 10 Longitudinal view of the electrode-cavity system in the preferred embodiment of the cyclotron radiation source.

In another alternative embodiment, it may be considered herein as cyclotron radiation source by making some modifications to the cavity. For such purpose, it should be avoided the target 11 on which the electrons impact, and consider a window in a tangential direction to the circular path of the electrons in the plane in which the longitudinal movement stop, and engages to the resonant cavity 1 to a vacuum sample processing chamber. A system of electrodes 23, which are manufactured from a microwave-transparent material preferably graphite, is adapted to the cavity preferably in the nodes planes of the electric field $TE_{11P}$ as shown in FIG. 10 for the $TE_{113}$ mode. The internal radius of the electrodes 23 must obviously be greater than the radius of rotation of the electrons. The insulating layers 24 allow performing different electrical potentials to each section of the cavity 1. The electrical potential along the axis of symmetry of the cavity, growing and non-monotonic, has an associated axially symmetric electrostatic field which opposes the effect of the diamagnetic force that allows electrons of the beam to move along the cavity, thereby controlling the plane where electrons stop their longitudinal movement.

In this alternative embodiment, the other elements remain the same.

The invention claimed is:

1. An X-ray source, comprising:

a cylindrical resonant cavity with length, a diameter and a longitudinal axis extending from a first end of the cylindrical resonant cavity to a second end of the cylindrical resonant cavity;

an electron gun located at the first end of the cylindrical resonant cavity;

a metallic target coupled to the cylindrical resonant cavity adjacent to the second end of the cylindrical resonant cavity;

a microwave field energizing system coupled to the cylindrical resonant cavity, the microwave field energizing system comprises two waveguides, each one having an end coupled to the cylindrical resonant cavity and the other end coupled to a microwave source;

at least one magnetic field source that generates a magnetic field that increases along the longitudinal axis of the resonant cavity, starting from the first end of the cylindrical resonant cavity to the second end of the cylindrical resonant cavity; and a window transparent to X rays, the window being incorporated into a cylindrical surface of the cylindrical resonant cavity, the window being arranged in a common transverse plane with the target;

wherein the length and diameter of the cylindrical resonant cavity meets a relationship according to the following expression:

$$d=p[(2f/c)^2-(1.841/\pi r)^2]^{-1/2}$$

wherein:

d is the length of the cylindrical resonant cavity;

p is the subscript of the resonance mode of the cylindrical resonant cavity;

f is the frequency of the microwave source;

c is the speed of light in vacuum; and r is the diameter of the cylindrical resonant cavity/2.

2. An X-ray source according to claim 1, wherein the magnetic field strength at the electron's point of injection is equal to the value to obtain the classical cyclotron resonance.

3. An X-ray source according to claim 2, wherein the magnetic field has a value of 875 Gauss at the injection point.

4. An X-ray source according to claim 1, wherein the magnetic field is axially symmetric, static and non-homogeneous.

5. An X-ray source according to claim 1, wherein the electron gun is a $LaB_6$ type electron emitter and injects an electron beam with about 10 keV of energy.

6. An X-ray source according to claim 1, wherein the metallic target has an internal cooling channel.

7. An X-ray source according to claim 1, wherein the metallic target is molybdenum.

8. An X-ray source according to claim 1, wherein the metallic window transparent to X-rays is made of beryllium.

9. An X-ray source according to claim 1, wherein the resonant cavity is made of copper.

10. An X-ray source according to claim 9, wherein the cylindrical resonant cavity resonates in the $TE_{112}$ mode.

11. An X-ray source according to claim 10, wherein the cavity length is 21 cm and the diameter is 9 cm.

12. An X-ray source according to claim 1, wherein the magnetic field source is generated by three permanent magnets.

13. An X-ray source according to claim 12, wherein the permanent magnets are made of $SmCO_5$ or FeNdB magnets.

14. An X-ray source according to claim 1, wherein the waveguides have a rectangular cross section.

15. An X-ray source according to claim 14, wherein the waveguides propagate in a $TE_{10}$ mode.

16. An X-ray source according to claim 15, wherein each waveguide comprises:

a—a ceramic window; and b—a ferrite insulator.

17. An X-ray source according to claim 16, wherein the ceramic window is made of $Si_2O_3$.

18. An X-ray source according to claim 1, wherein the ends of the waveguides coupled to the cylindrical resonant cavity are located at a distance of ¼ of the total cavity length, measured from the end where the electron gun is located.

19. An X-ray source according to claim 1, wherein the microwave source is a magnetron.

20. An X-ray source according to claim 19, wherein the magnetron has an operating frequency of 2.45 GHz and excites a microwave field of 7 kV/cm.

21. An X-ray source according to claim 1, wherein the waveguides used for the injection of microwaves into the cavity differ in their lengths by $\lambda/4$, where $\lambda$ is the wavelength of the $TE_{10}$ mode.

22. An X-ray source, comprising:

a rectangular resonant cavity having a length, width and a longitudinal axis extending from a first end of the cavity to a second end of the rectangular resonant cavity;

an electron gun located at the first end of the rectangular resonant cavity;

a metallic target coupled to the rectangular resonant cavity adjacent to the second end of the rectangular resonant cavity;

a microwave field energizing system coupled to the rectangular resonant cavity, the microwave field energizing system comprises a waveguide, the waveguide having a first end coupled to the rectangular resonant cavity and a second end coupled to a microwave source;

at least one magnetic field source that generates a magnetic field, the magnetic field increasing along the longitudinal axis of the rectangular cavity, starting from the first end of the rectangular resonant cavity to the second end of the rectangular resonant cavity; and a window transparent to X rays, the window being incorporated into a rectangular surface of the rectangular resonant cavity, the window being arranged in a common transverse plane with the target;

wherein the length and width of the rectangular resonant cavity meets a relationship according to the following expression:

$$d=p[(2f/c)^2-(1/a)^2]^{-1/2}$$

wherein:

d is the length of the rectangular resonant cavity;

p is the subscript of the resonance mode of the rectangular resonant cavity;

f is the frequency of the microwave source;

c is the speed of light in vacuum; and a is the cavity width.

23. An X-ray source according to claim 22, wherein the first end of the waveguide is coupled to the rectangular resonant cavity through an iris, and said waveguide propagates a $TE_{10}$ mode.

24. An X-ray source according to claim 23, wherein the microwave source is a magnetron located at a distance of $\lambda/4$ from the end coupled to the rectangular resonant cavity, where λ is the wavelength of the $TE_{10}$ mode.

25. An X-ray source according to claim 22, wherein the rectangular resonant cavity resonates in $TE_{102}$ mode.

26. An X-ray source according to claim 25, wherein the dimensions of the rectangular resonant cavity are a=7.74 cm, d=20 cm and a height of 3.87 cm.

* * * * *